Dec. 27, 1966  J. P. KNEISEL  3,294,014
DEEP CAVITY DIE BURNING APPARATUS AND PROCESS
Filed Aug. 23, 1965  5 Sheets-Sheet 1

JOSEPH P. KNEISEL
INVENTOR.

BY Lyon & Lyon
ATTORNEYS

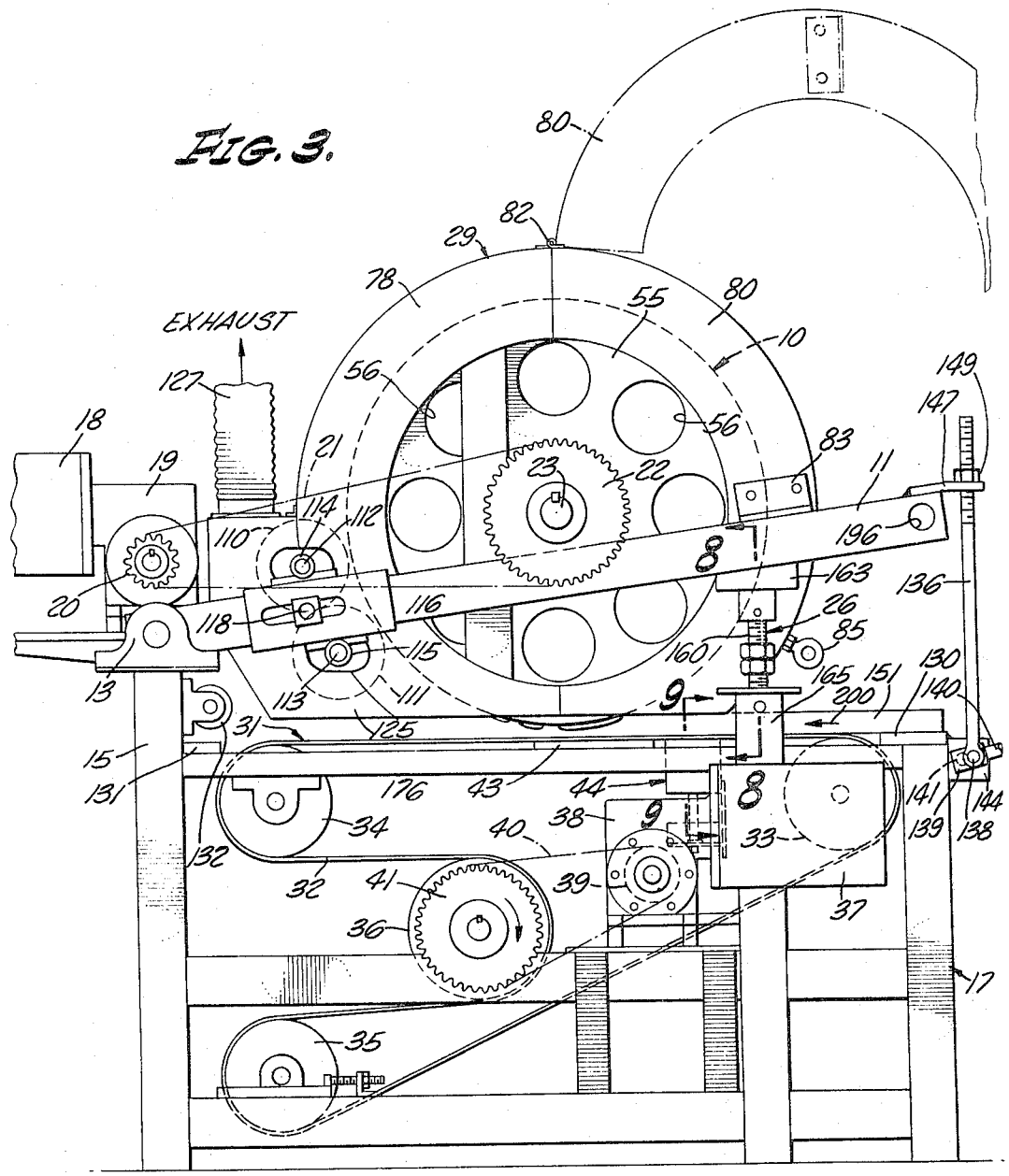

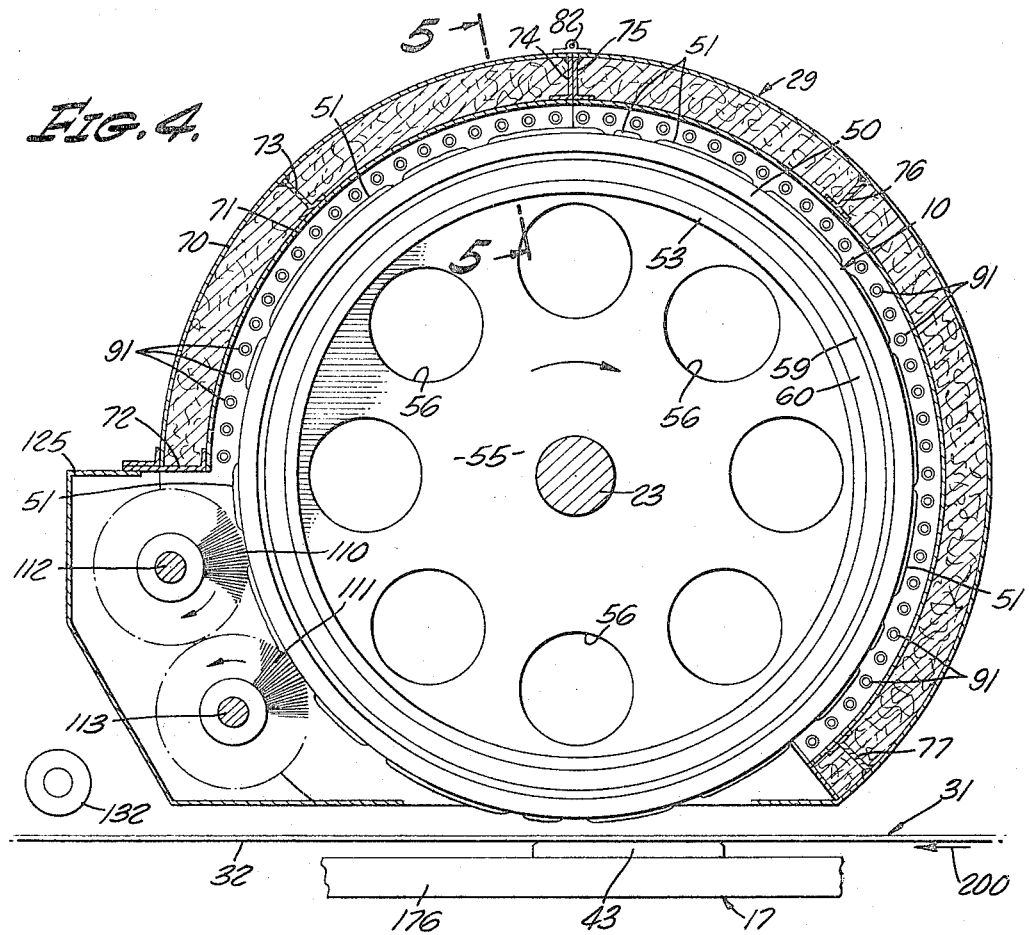

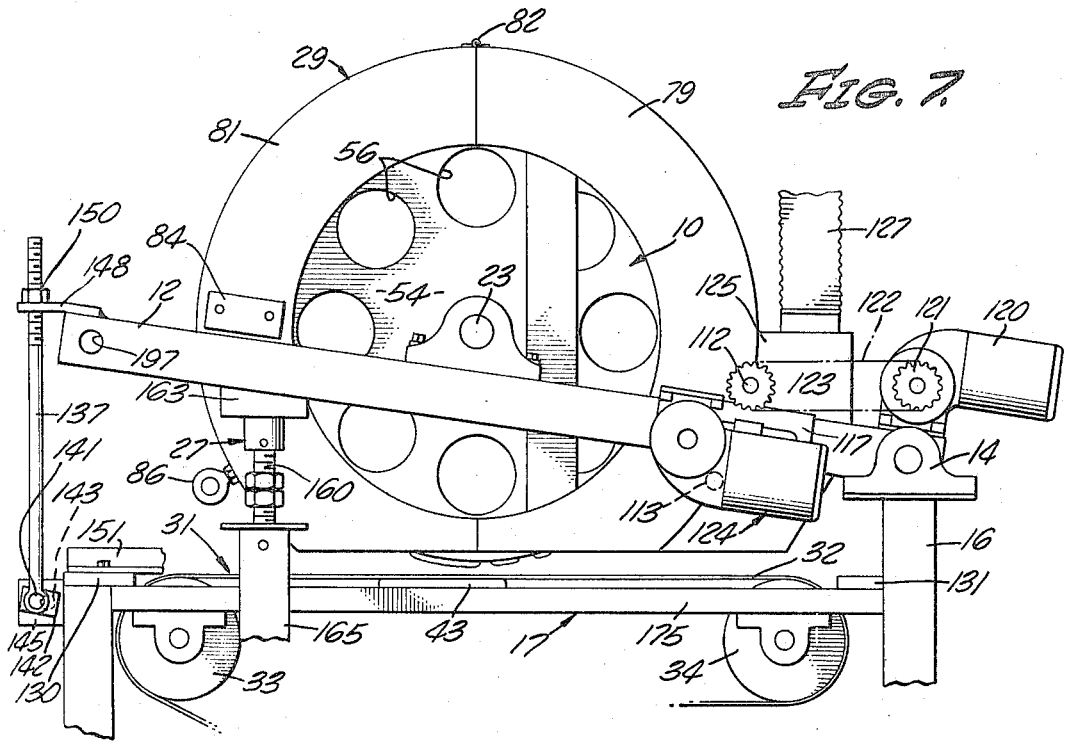
FIG. 7.
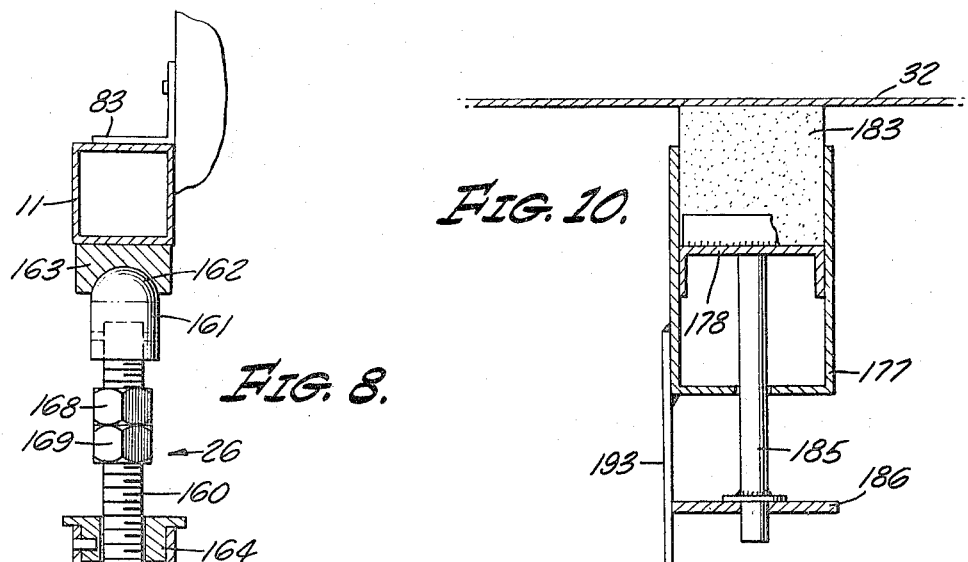
FIG. 8.
FIG. 10.
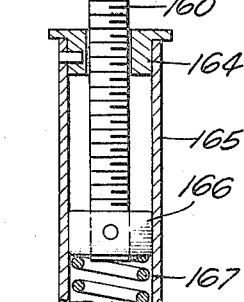
JOSEPH P. KNEISEL
INVENTOR.
BY Lyon & Lyon
ATTORNEYS Dec. 27, 1966   J. P. KNEISEL   3,294,014
DEEP CAVITY DIE BURNING APPARATUS AND PROCESS
Filed Aug. 23, 1965   5 Sheets-Sheet 5

JOSEPH P. KNEISEL
INVENTOR.

BY
ATTORNEYS

3,294,014
DEEP CAVITY DIE BURNING APPARATUS AND PROCESS
Joseph P. Kneisel, 3920 El Lado Drive,
La Crescenta, Calif. 91014
Filed Aug. 23, 1965, Ser. No. 481,771
8 Claims. (Cl. 101—8)

This invention relates to an apparatus and process for forming cavities in a material by means of a heated die and more particularly to an apparatus and process whereby a heated die forms relatively deep cavities in a material through the application of accurately controlled heat and pressure and the use of the gases created to remove portions of said material.

The apparatus and process of the present invention utilize a technique, which may be termed "pyro-carving," for simulating and duplicating artistically created designs and/or natural and other defects in wood and similar material. Such designs or defects may be large in area, relatively deep and of odd shapes. Typical examples of such defects are worm holes, fungus cavities, pitch pockets, etc.

Various methods and apparatus have been proposed in the past for simulating defects in wood and the like. Among such apparatus have been those for embossing, punching, scraping or chipping the surface of the wood to achieve the desired effect. The surface of a material such as wood may be embossed by the application of pressure alone, or through the application of both pressure and heat to the embossing means. Typical methods of embossing by the utilization of heat and pressure are known as pyrography and essentially result only in surface decoration by simple indentation and branding but with no removal of material. Substantially any material that will burn, char or discolor with the application of heat may be decorated by this pyrographic process, which is not true with the pyrocarving process. It is essential that the material being pyrocarved contain the necessary water or chemical content in order to form the required gases to expel the charred material ahead of the die.

The duplication of large and deep cross-sections has been found to be relatively difficult if not impossible with such prior approaches. Embossing generally has not been found practical because it is substantially impossible to compress large amounts of material into the areas surrounding the intended depressions. The removal of large amounts of the material by means of power driven cutters and the like is extremely impractical both from a technical and a production standpoint. Burning alone creates only a charred and discolored area of limited penetration for any practical die temperature and the resultant charcoal not being removed, makes the area physically unsound.

Accordingly, it is an object of the present invention to provide an improved process and apparatus for simulating natural and artificial defects in a material.

It is a further object of this invention to provide an improved process and apparatus for forming relatively deep cavities in a material in a continuous manner through decomposition by the action of heat.

It is a further object of this invention to provide an improved process and apparatus for forming relatively deep cavities in a material in a continuous manner through decomposition and ejection by the action of accurately controlled heat pressure and gases created by the superheated water and chemical content of the material being processed.

It is an additional object of this invention to provide improved means for forming a plurality of cavities in a material in an improved and continuous manner.

A still further object of this invention resides in a machine for simulating natural and/or artificial defects in a material, such as wood in an improved manner by the use of a rotary die which effectively causes the decomposition and ejection of portions of said material by means of accurately controlled heat and pressure and resultant gases.

In accordance with an exemplary embodiment of the teachings of the present invention, an apparatus and process for forming relatively large and deep depressions in a material, such as wood, is provided and employs a continuously rotating drum, the outer periphery of which serves as a die. The outer periphery of the drum may be arcuate, e.g., cylindrical, and has a plurality of various shaped protrusions on the surface thereof to form the desired cavities and pattern of cavities in the material to be processed. The die face of the drum is heated by a suitable means. The material to be processed, which typically may be a sheet of solid wood or plywood, is fed parallel to the axis of rotation of the drum and tangential to the periphery thereof by a travelling bed which is backed-up by a platen.

The die face of the drum may be suitably enclosed and the heat source may be located in the enclosure adjacent the die face or within the die face itself. The drum may be provided with an expansion joint arrangement for permitting expansion and contraction of the die face caused by the applied heat. Counter-rotating brushes may engage the periphery of the die face for removing any particles of material which may adhere thereto.

The travelling bed may include a belt, and lubricating means may be provided therefor, with the belt being driven from a non-lubricated surface to minimize slippage thereof, or by a conventional steel slat travelling bed or any other type of suitable conveyance which will support material under extreme pressure. Exhaust means are provided for allowing the removal of steam, gases and decomposition products created by the heated die face contacting the material being processed.

The protrusions on the die face penetrate the material to the desired depth by heat decomposition and gas ejection of the material thereby leaving clean and sound cavities. The cavities are essentially a mirror image of the die protrusions. Because of the thermal decomposition and ejection of the decomposed material by the created gases, all surfaces of the material are sound with no soft char remaining, and if the material is wood, the surfaces of the cavities therein are sealed to a substantial degree by the resins which are brought to the surface of the cavity and baked by the heated die face.

If the penetration of the heated die into the material is too slow, proper thermal decomposition does not occur. In this case sufficient gases are not created and expelled rapidly enough to clear the cavity of burned material ahead of the die, and a thick layer of charred material will form an insulating barrier and prevent further burning or penetration. If the die penetrates the material too rapidly, the material structure may be substantially weakened or destroyed. Thus, it may be understood that control of heat, pressure and feed speed of the material is necessary. These factors must be adjusted to desired relationship for proper operation of the process, and it will be understood that the relationship thereof will vary with the material being processed.

These and other objects and features of this invention will become more apparent through a detailed consideration of the following description taken in conjunction with the accompanying drawings in which:

FIGURE 3 is a left side elevation of the apparatus shown in FIGURE 1;

FIGURE 4 is a partial sectional elevation of a drum and cover taken substantially along the line 4—4 of FIGURE 1;

FIGURE 5 is a partial cross-sectional view of the drum and cover taken substantially along the line 5—5 in FIGURE 4;

FIGURE 6 is a fragmentary sectional view of a portion of the drum shown in FIGURE 5 with the die in an expanded position;

FIGURE 7 is a partial side elevation illustrating a portion of the right side of the apparatus shown in FIGURE 1;

FIGURE 8 is a sectional view of a drum support member taken along the line 8—8 in FIGURE 3;

FIGURE 10 is a sectional elevation of the belt and the lubricating means taken along the line 10—10 in FIGURE 9.

Figure 1:
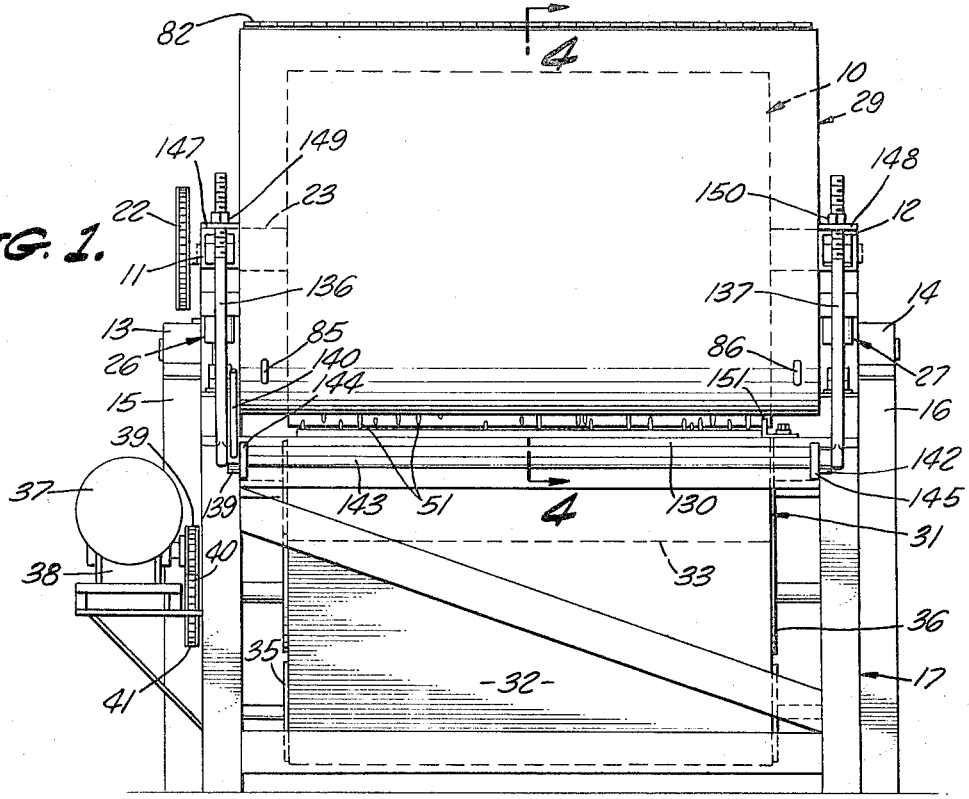
FIGURE 1 is a front elevation of an apparatus constructed in accordance with the teachings of the present invention.
Figure 2:
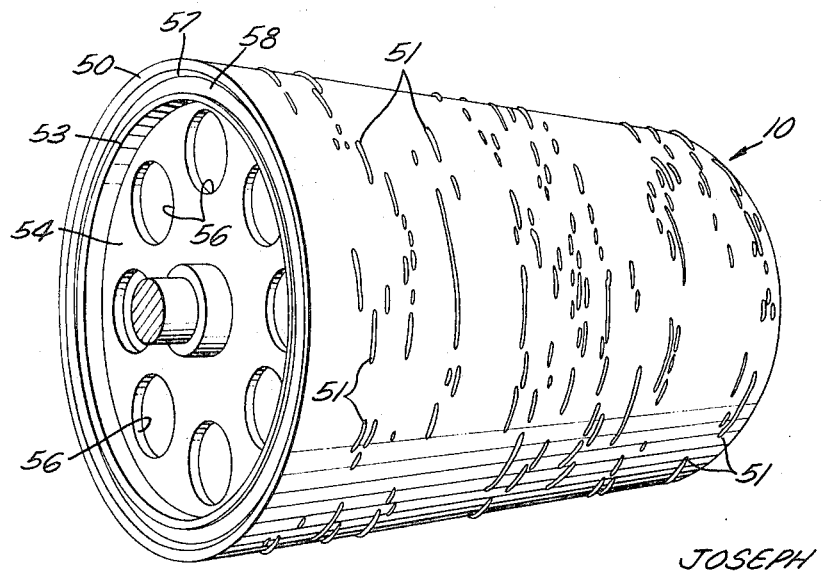
FIGURE 2 is a perspective view of the drum having a die on the periphery thereof and which may be utilized in the apparatus shown in FIGURE 1.

Referring now to the drawings, and particularly to FIGURES 1 through 5, an apparatus for forming cavities in a material constructed in accordance with the concepts of this invention is illustrated. A drum, generally denoted by the reference numeral 10, is rotatably supported in bearings affixed to supporting arms 11 and 12 which may be in the form of elongated channels having a rectangular cross-section. One end of each of the arms 11 and 12 is pivoted in respective bearings 13 and 14 which in turn are affixed to vertical supports 15 and 16, respectively. The supports 15 and 16 are affixed to rear legs of a supporting frame, generally designated by the reference numeral 17, for the apparatus. The supporting frame 17 essentially includes a plurality of legs and cross braces therebetween which are affixed together, as by welding, to provide a sufficiently strong and rigid structure for the various other components of the apparatus.

A motor 18 drives the drum 10 through a gear box 19 having a sprocket 20 keyed to the output shaft thereof, a chain 21, and a sprocket 22 which is keyed to a shaft 23 extending centrally through the drum 10. Supports, generally designated by the reference numerals 26 and 27 (note particularly FIGURES 3, 7 and 8), essentially in the form of screw jacks are located between the respective arms 11 and 12 and legs of the frame 17 for supporting and positioning the drum 10 with respect to the material to be processed as will be described in greater detail subsequently. A housing, generally designated by the reference numeral 29, is arranged about a major portion of the periphery of the drum 10.

A travelling bed, generally designated by the reference numeral 31, includes a belt 32 of flexible material, such as rubber, arranged about idler drums 33 through 35 and a drive drum 36. Each of drums 33 through 36 includes a central shaft which is supported at its ends in suitable bearing members attached to the frame 17. The bearings for the drum 35 may include adjusting means coupled with the bearings and the frame 17 to thereby enable adjustment of the position of the drum 35 for providing a proper tension on the belt 32. A motor 37 drives the drum 36 through a gear box 38, a sprocket 39 affixed to the output shaft of the gear box, a chain 40, and a sprocket 41 keyed to the shaft of the drum 36. The motor 37 and gear box 38 are suitably attached to the frame 17.

A rectangular platen 43 is affixed to the frame 17 parallel with the axis of rotation of the drum 10. At least a portion of the platen 43 is located below the axis of the drum 10, and a substantial portion thereof extends forward of this axis toward the feed end (on the right in FIGURE 3) of the apparatus. The platen 43 may have a polished chrome face located below and adjacent the belt 32, and provides a support for the bottom of the material being processed as the top of this material is contacted by the die of the drum 10 as will be explained in greater detail subsequently. Lubricating means, generally designated by the reference numeral 44, is provided for lubricating the under surface of the belt 32 and will be described with more particularity subsequently.

The outer periphery of the drum 10 includes a die, generally denoted by the reference numeral 50 (note particularly FIGURE 2) having a plurality of protrusions 51 thereon. The die 50 and protrusions 51 are made of a material, such as steel, sufficient to withstand the heat and pressures necessary to suitably process a desired material. As better shown in FIGURE 5, the drum 10 includes an inner or support drum including end walls 54 and 55 and the shaft 23 mounted centrally through the end walls. The end walls 54 and 55 each may include a plurality of vents 56 for allowing heat to escape from the interior of the drum 53 and for reducing the overall weight thereof. The drum 10 further includes the cylindrical die 50 which is supported on the drum 53 by rings 57 through 60. The rings 57 and 59 are affixed to the interior surface of the cylindrical die 50 toward the ends thereof by suitable fastening means, such as bolts 61 and 62. The rings 58 and 60 are affixed to the outer cylindrical surface of the drum 53 toward the ends thereof by suitable fastening means, such as bolts 63 and 64. As may be seen in FIGURES 5 and 6, the interior surfaces of the rings 57 and 59 and the exterior surfaces of the rings 58 and 60 are suitably inclined and mated to form expansion joints. Thus, the die 50 may expand or contract as necessary as a result of heat changes, with the relative positions of the rings 57 and 58 for expansion of the die 50 being shown in FIGURE 6. If desired, suitable insulation may be provided in the annular space between the outer periphery of the inner drum 53 and the interior surface of the outer drum or die 50. A typical outside diameter for the drum 50 is 36 inches. It will be appreciated that the surface of the die 50 may take many various forms, and may include many types of protrusions for effecting the desired pattern, size and depth of cavities in material to be processed.

A housing 29, as best shown in FIGURES 4 and 5, includes substantially cylindrical outer and inner walls 70 and 71, respectively. The walls 70 and 71 are spaced apart and fixed together by suitable beams 72 through 77. The void between the walls 70 and 71 preferably is filled with a suitable insulating material, such as asbestos. The housing 29 further includes exterior covers 78 through 81 (see FIGURES 3 and 7) attached to the ends of the walls 70 and 71. The housing 29 essentially is formed in two parts which are hinged together by a suitable hinge 82. The housing 29 is affixed to the rear ends (those closest to the bearings 13 and 14) of the arms 11 and 12, and includes flanges 83 and 84 by which the forward hinged portion of the housing 29 may be releasably attached to the forward ends of respective arms 11 and 12. Heavy duty eyelets 85 and 86 are attached to the hinged forward portion of the housing 29, and suitable hoisting means may be attached to the eyelets 85 and 86 to aid in opening the housing 29 to provide access to the drum 10 or interior of the housing 29.

Inner ring-like covers 88 and 89 are attached to the inner and outer walls 70 and 71. The interior of the drum housing 29 is provided with any suitable heating means, a plurality of heating rods 91 arranged near the interior surface of the inner wall 71 being illustrated, for heating the surface of the die 50. The interior surface of the inner wall 71 and the interior surfaces of the covers 88 and 89 serve as reflectors for the heat generated by the rods 91. The rods 91 preferably extend through holes in the covers 88 and 89, and are supported by retainer rings 92 and 93. Insulating washers 94 and 95 are provided on the respective ends of the rods 91, as well as suitable washers 96 and 97, all secured by nuts 98 and 99. A terminal 100 extends from each of the rods 91, and this terminal as well as the exterior (which may serve as a terminal) of the rods 91 are connected to a suitable source of electrical power. For example, all of the terminals 100 of the rods 91 may be connected together to one terminal of an electrical power source, and all of the washers 96 may be interconnected to form a bus bar which in turn is connected to the other terminal of the power source. The retainer rings 92 and 93 may be secured to the inner covers 88 and 89 by cap screws, with the voids between the retainer 92 and cover 88, and the retainer 93 and cover 89 being suitably filled with an insulating material, such as asbestos. The exterior covers 78 through 81 are provided over the ends of the drum housing 29 and are attached to the retainers 92 and 93, or other suitable parts, by cap screws or other fastening means.

A pair of counter-rotating brushes 110 and 111 (FIGURE 4) having their axes of rotation parallel to the axis of rotation of the drum 10 are provided for brushing the entire face of the die 50 as it rotates. The brushes 110 and 111 preferably are counter-rotating at different speeds, and at different speeds with respect to the drum 10, for increasing the efficiency of their cleaning action. The brushes 110 and 111 have respective shafts 112 and 113, the ends of which are supported in bearings, such as respective bearing 114 and 115 shown in FIGURE 3, attached to channel members 116 and 117. The channel members 116 and 117 are attached to the respective arms 11 and 12 by suitable fastening means, such as a bolt and nut 118 shown in FIGURE 3, which allow the channel members 116 and 117 to be selectively positioned along a portion of the respective arms 11 and 12 for adjusting the position of the bushes 110 and 111 with respect to the periphery of the die 50. The channel members 116 and 117 also allow the brushes 110 and 111 to be disengaged from the die 50, if desired. The upper brush 110 is driven by means of a motor and gear assembly 120 (note FIGURE 7) having a sprocket 121 on the output shaft thereof, through a chain 122 and a sprocket 123 keyed to the shaft 112. The brush 111 is driven in a similar manner from a motor and gear assembly 124.

A cover 125 is attached to the housing 29 and partially encloses the brushes 110 and 111. The cover includes an exhaust part 127 which allows gases, fumes, etc., resulting from burning material to escape.

Entry and exit platforms 130 and 131 (see FIGURE 3) are mounted on the frame 17 for supporting the material to be processed as it is fed onto, and exits from, the belt 32. A hold-down roller 132 also is mounted on the frame 17 for engaging the upper surface of the material being processed as it is fed through the apparatus. As will be discussed in greater detail shortly, the arms 11 and 12 are held up by the drum support members 26 and 27. The arms 11 and 12 are held down by hold-down bars 136 and 137, respectively. The lower end of the bar 136 is pivotally mounted on a pin 138 attached to the base member 139 of a lever arm 140. The lower end of the bar 137 is pivotally mounted on a pin 141 affixed to a similar base member 142. The base members 139 and 142 are connected by a rod 143 which extends through flanges 144 and 145 affixed to the frame 17. The pins 138 and 141 are arranged on the same axis which is spaced away from the axis of the rod 143. The upper ends of the bars 136 and 137 extend through holes in respective lug members 147 and 148 which in turn are affixed to arms 11 and 12, respectively. Hold down adjustment nuts 149 and 150 are threaded onto the repsective ends of the bars 136 and 137. Movement of the lever arm 140 in a clockwise direction (as shown in FIGURE 3) causes the arms 11 and 12 to be held down and locked into a position determined by the adjustment of the drum support members 26 and 27 and the nuts 149 and 150 during insertion, and passage through, of material into the apparatus. The drum support members 26 and 27 include counter-balance springs (which will be discussed subsequently) which raise the arms 11 and 12 when the lever arm 140 is raised (rotated counterclockwise in FIGURE 3). A guide rail 151 is attached in the frame 17 for properly positioning the material as it is fed into the apparatus.

One of the drum support members 26 is illustrated in greater detail in FIGURE 8 and includes a threaded rod 160 pinned at its upper end to a head 161 having a hemispherical upper end 162 which mates with a concave cavity in a block 163. The block 163 is affixed to the lower side of the arm 11. The lower end of the rod 160 extends through a hole in a cap 164 affixed to the upper end of a leg 165 of the frame 17. The lower end of the rod 160 is pinned to a collar 166 which rests on a counter-balance spring 167. Nuts 168 and 169 may be threaded onto the rod 160 for positioning and locking the rod with respect to the cap 164 thereby setting the position of the arm 11 (drum support member 27 likewise positions the arm 12) for setting the position of the drum 10. Thus, by adjusting the drum supporting members 26 and 27 the face of the die 50 may be appropriately positioned with respect to the belt 32 and platen 43 (and hence positioned with respect to material fed into the apparatus on the belt).

Figure 9:
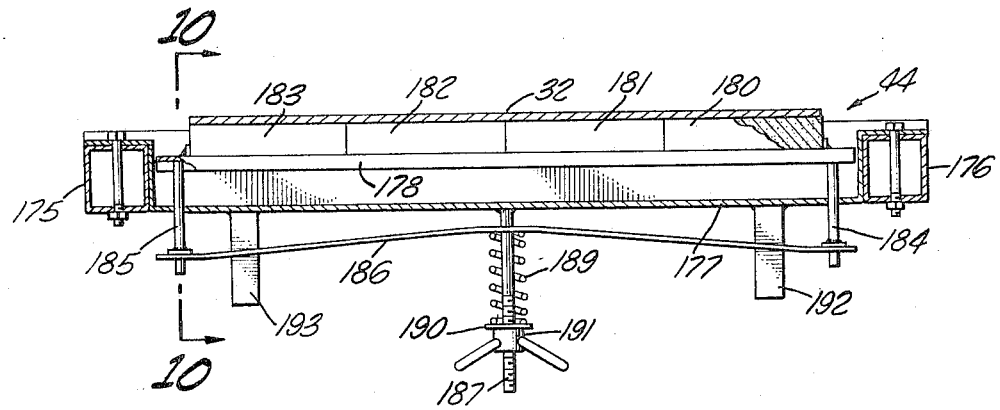
FIGURE 9 is an elevation, partially in section, of a belt and adjustable lubricating means therefor taken along the line 9—9 in FIGURE 3.
Figure 11:
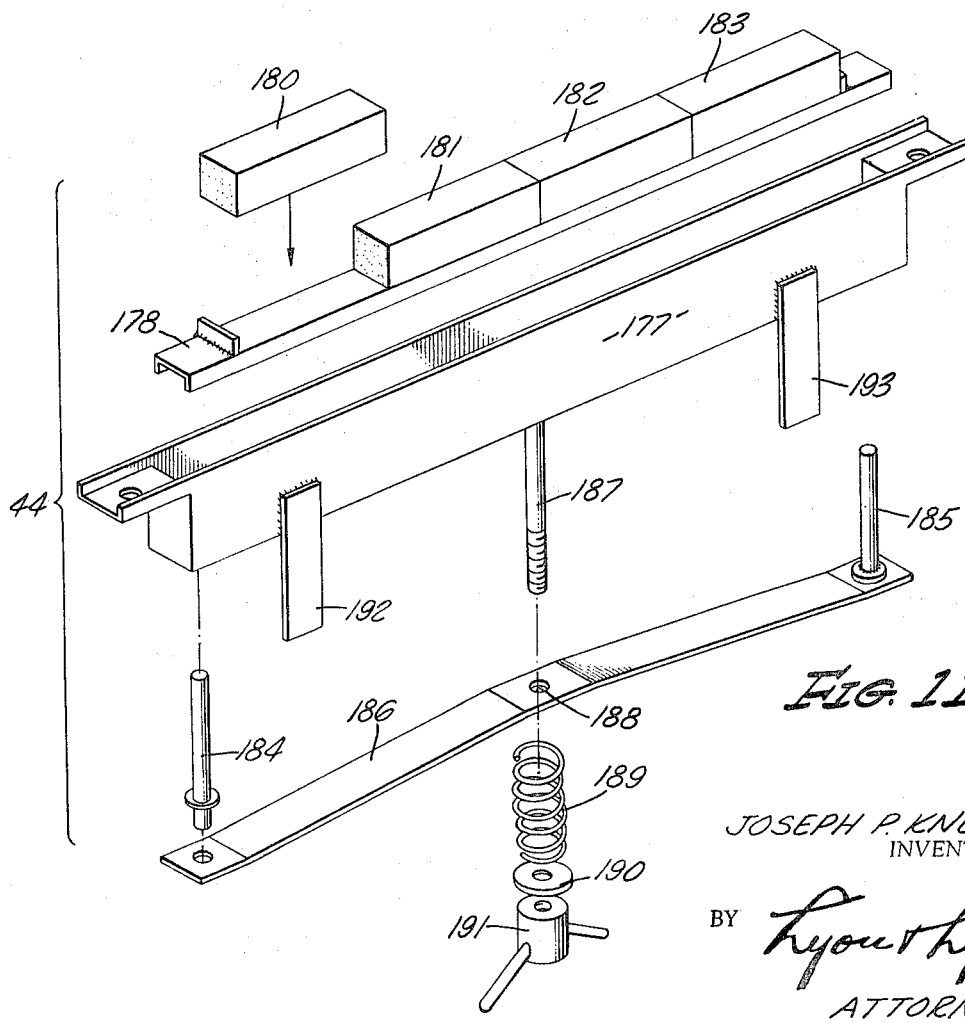
FIGURE 11 is a perspective view of the adjustable lubricating means.

The adjustable lubricating means 44 is provided for lubricating the underside of the belt 32 while the belt is driven from its upper surface by the drum 36. This lubricating means is shown in greater detail in FIGURES 9 through 11. Horizontal channels 175 and 176 of the frame 17 support a cross-channel 177. A holder 178 is provided for retaining a plurality of lubricating blocks 180 through 183, such as graphite blocks or a felt oiling wick, between tabs on the holder. The holder 178 is supported and biased upwardly by means of support rods 184 and 185 which extend through apertures in the cross-channel 177 into mating holes in a platform arm 186. A stud 187 is attached to the bottom of the channel 177 and extends through a hole 188 in the arm 186. A spring 189 and washer 190 are retained on the stud 187 by means of a wing nut 191. Thus, the spring 189 biases the arm 186 upwardly which in turn (through support rods 184 and 185, and the holder 178) urges the lubricating blocks 180 through 183 against the under surface of the belt 32. Guide tabs 192 and 193 are affixed to a side of the channel 177 and maintains the proper orientation of the arm 186 with respect to the channel 177. The resiliency of the spring 189, and the arm 186, aid in ensuring proper contact of the blocks 180 through 183 with the under-surface of the belt 32. The wing nut 191 provides a take-up adjustment to compensate for block wear.

Apertures 196 and 197 (see FIGURES 3 and 7) are provided in the ends of respective arms 11 and 12. A suitable rod or other means may be inserted through both of the holes 196 and 197 for aiding in raising the drum and drum housing assembly while the drum support members 26 and 27 are being appropriately adjusted. For this purpose, a hoist may be hooked onto the rod for pivoting the arms 11 and 12 about the pivot points of the bearings 13 and 14 during the adjustment.

In processing material with the apparatus above-described, the material (such as solid wood or plywood) in sheet, panel or board form is fed into the apparatus under the drum 10 in the direction shown by an arrow 200 in FIGURE 3. An edge of material is positioned against the guide rail 151 and slid onto the belt 32 which in turn carries the material beneath the die 50 and out under the hold-down roller 132 at the exit end of the apparatus. The heating rods 91, to which a suitable source of electrical power is connected, heat the surface of the die 50, and the protrusions 51 therefrom effectively burn into the material. Cavities are thus formed in the material by pyrolysis (chemical decomposition by the action of the heated protrusions 51) and by gaseous ejection and thus substantial portions of the material can be removed. For example, some cavities typically may extend half-way through the panel. The cavity size is determined by the size of the protrusions 51, and the depth of the cavities is determined by the height of the protrusions with respect to the face of the die 50 as well as the relative position of the die 50 with respect to the belt 32 and the platen 43. Preferably, the linear speed of the periphery of the die 50 is the same as the linear speed of the belt 32. A typical temperature of the die face may be in the neighborhood of 1,200° F., and downward pressure of around 1800 p.s.i., and a linear speed of approximately 25 to 40 feet per minute, but it will be appreciated that these valves can vary depending on the material being processed. It thus can be seen that the insertion or penetration speed of a three-eighths inch protrusion 51 into the material for proving a typical three-eighth inch deep cavity may range from approximately four feet per minute using a linear feed speed of material of forty feet per minute to approximately two and one-half feet per minute at a linear feed speed of twenty-five feet per minute. The protrusions 51 of the die 50 penetrate the material to the desired shape and depth leaving clean sound cavities. The burned and charred material created by the hot die constantly is removed ahead of the die by the escape of steam and gases from the moisture and chemical content of the material itself, and virtually no char or ash is left. The rotary drum 10 enables continuous processing of material, and also enables essentially any desired pattern placement in the material since it may initially engage the die 50 at any point.

The travelling bed 31 including the belt 32 riding over the platen 43 is particularly advantageous over a backup drum type arrangement because of the large size and depth of cavities desired. The die 50 begins its entry into the material well out from the vertical center line of the drum 10, and continues this entry and pressure until the material passes the center line.

It now will be apparent that the present invention provides improved apparatus for forming large and deep cavities in materials, such as wood, which heretofore has been relatively costly or technically impractical. This apparatus provides a means for continuously and rapidly duplicating or forming intricate and deep cavities in material for many purposes.

It will be understood that although an exemplary embodiment of the present invention has been disclosed and discussed, other applications and structural arrangements are possible. For example, the die may be mounted on any arcuate surface and may contact the material being processed continuously or intermittently. Furthermore, the die may be mounted on a flat platen which is held stationary while in contact with the work piece or which moves with the work piece. Thus, the embodiment disclosed in detail may be subjected to various changes, modifications, and substitutions without necessarily departing from the spirit of the invention.

What is claimed is:

1. A method of creating deep and sound cavities in a given type of wood without structurally damaging the wood bounding such cavities, said wood having volatile matter therein which can be violently released as gases when heated to a high temperature, comprising the steps of
heating die means to a temperature which will cause violent release of volatile matter from said type of wood as gases upon contact with said die means with said type of wood to carry away substantially all products of thermal decomposition resulting from said contact,
engaging a piece of said type of wood with said die means and moving said die means into said piece of wood at a substantially constant rate to a desired depth to produce a cavity,
adjusting the relationship of the rate of insertion of said die means into a piece of said type of wood and the temperature of said die means if said resulting cavity is bounded by substantially any charred material or crushed into said piece of wood,
repeating said steps of engaging a piece of wood and adjusting until a clean, sound and uncrushed cavity with substantially no charred material therein is obtained, and
moving said die means into a piece of said type of wood with the selected relationship of rate of insertion and temperature of said die means to create a deep and sound cavity therein by causing the violent release of volatile matter as gases to carry away substantially all products of thermal decomposition and prevent the build-up of charred material in the last named cavity.

2. A method of creating deep and sound cavities in a given type of wood without structurally damaging the wood bounding said cavities, said wood having volatile matter therein which can be violently released as gases when heated to a high temperature, comprising the steps of
heating die means to a temperature which will cause violent release of volatile matter from said type of wood as gases upon contact of said die means with said type of wood to carry away substantially all products of thermal decompostion resulting from said contact,
engaging a piece of said type of wood with said die means and moving said die means into said piece of wood at a substantially constant rate to a desired depth to produce a cavity,
increasing the rate of insertion of said die means into a piece of said type of wood if said resulting cavity is bounded by substantially any charred material, or reducing said rate of insertion of said die means into a piece of said type of wood if a cavity results from crushing said wood,
repeating said steps of engaging a piece of wood, and increasing or reducing said rate of insertion until a clean and sound cavity with substantially no charred material therein is obtained, and
moving said die means into a piece of said type of wood with the selected rate of insertion and with said die means at said temperature to create a deep and sound cavity therein.

3. In an apparatus for creating deep discontinuous cavities in a wooden material, the combination of
die means having an arcuate surface with a plurality of irregularly shaped discontinuous radial protrusions over said surface and extending therefrom, said protrusions serving to penetrate a surface of said material at a substantially constant rate when heated and cause the violent release of volatile matter contained in said material as gases which carry away substantially all products of thermal decomposition and prevent the build-up of charred material,
housing means arranged over a substantial portion of said die means for heating said protrusions to said temperature, and
feed means for supporting and moving said material into contact with said protrusions at a substantially constant linear speed, said feed means including a platen and movable bed means passing over a surface of said platen, said bed means serving to move said material into engagement with said protrusions, said surface of said platen being substantially tangential to the periphery of said die means and having a width at least equal to the width of the surface of said die means having said protrusions thereon and having a length in the direction of the travel of said material toward said die means sufficient to provide back-up support for said material during the entire period of penetration of said protrusions of said die means into said material.

4. In an apparatus for creating deep irregular discontinuous cavities in wood, the combination comprising frame means for supporting a platen and movable bed means for passing over said platen, said bed means serving to feed said wood into said apparatus at a substantially constant linear rate, rotary die means for engaging said wood and creating said cavities therein, said die means including a peripheral surface having a plurality of radial irregular discontinuous protrusions extending from the peripheral surface thereof, the peripheral surface thereof having a length equal to or greater than the length of wood to be processed, said protrusions causing the violent release of moisture and volatile matter in said wood as gases when heated and caused to penetrate said wood, support means for rotatably supporting said die means and coupled with said frame means for pivotally mounting said die means with respect to said platen for selecting the depth of penetration of said protrusions into said wood, housing means arranged over a substantial portion of said die means for heating said die means and gases released from said wood, said housing means including cover means for covering a substantial portion of the peripheral surface of said die means and including heating means mounted in said cover means adjacent said peripheral surface for heating said protrusions to said temperature for causing said violent release of moisture and volatile matter in said wood as gases to carry away substantially all products of thermal decomposition of said wood and prevent the build-up of charred material within said cavities ahead of said protrusions as said protrusions penetrate said wood.

5. An apparatus for creating deep irregular discontinuous cavities in wood, the combination comprising rotary drum means for receiving heat and engaging said wood for causing the violent release of moisture and volatile matter from said wood as gases to carry away substantially all products of thermal decomposition, said drum means including an inner drum, a substantially cylindrical die means mounted over said inner drum and coaxial therewith, and expansion joint means coupling said inner drum and said die means for allowing thermal expansion of said die means upon the application of heat thereto, said die means including a plurality of radial irregular discontinuous protuberances extending from the peripheral surface thereof, said protuberances serving to engage a surface of said wood and penetrate said surface to create said cavities therein, heating means for heating said die means, and means for supporting and feeding said wood into engagement with said protrusions.

6. The combination as defined as in claim 5 wherein said expansion joint means includes a first pair of rings mounted toward the ends of the outer periphery of said inner drum, each of said rings having an inclined surface, and a second pair of rings mounted toward the ends of the interior of said die means, each of said second pair of rings having an inclined surface mating with the respective inclined surfaces of said first pair of rings.

7. A method of creating deep and sound cavities in a given type of wood without structurally damaging the wood bounding said cavities, said wood having volatile matter therein which can be violently released as gases when heated to a high temperature comprising the steps of heating die means to a temperature of approximately twelve hundred degrees Fahrenheit to cause violent release of volatile matter from said type of wood as gases upon contact of said die means with said type of wood to carry away substantially all products of thermal decomposition resulting from said contact, engaging a piece of said type of wood with said die means and moving said die means into said piece of wood at a substantially constant rate to a desired depth to produce a cavity, increasing the rate of insertion of said die means into a piece of said type of wood if said resulting cavity is bounded by substantially any charred material, or reducing said rate of insertion of said die means into a piece of said type of wood if a cavity results from crushing said wood, repeating said steps of engaging a piece of wood and increasing or reducing said rate of insertion until a clean and sound cavity with substantially no charred material therein is obtained, and moving said die means into a piece of said type of wood with the selected rate of insertion greater than one foot per minute and with said die means at approximately twelve hundred degrees Fahrenheit to create a deep and sound cavity therein.

8. A method of creating deep and sound cavities in a given type of wood without structurally damaging the wood bounding said cavities, said wood having volatile matter therein which can be violently released as gases when heated to a high temperature comprising the steps of heating die means to a temperature of approximately twelve hundred degrees Fahrenheit to cause violent release of volatile matter from said type of wood as gases upon contact of said die means with said type of wood to carry away substantially all products of thermal decomposition resulting from said contact, engaging a piece of said type of wood with said die means and moving said die means into said piece of wood at a substantially constant rate to a desired depth to produce a cavity, increasing the rate of insertion of said die means into a piece of said type of wood if said resulting cavity is bounded by substantially any charred material, or reducing said rate of insertion of said die means into a piece of said type of wood if a cavity results from crushing said wood, repeating said steps of engaging a piece of wood and increasing or reducing said rate of insertion until a clean and sound cavity with substantially no charred material therein is obtained, and moving said die means into a piece of said type of wood with the selected rate of insertion between approximately two and one-half to four feet per minute and with said die means at approximately twelve hundred degrees Fahrenheit to create a deep and sound cavity therein.

References Cited by the Examiner

UNITED STATES PATENTS

| | | | |
|---|---|---|---|
| 95,833 | 10/1869 | Ponsonby | 101—25 |
| 731,011 | 6/1903 | Augustine | 101—425 X |
| 1,480,025 | 1/1924 | Speer | 101—24 |
| 1,676,111 | 7/1928 | Reiber | 101—25 |
| 1,700,968 | 2/1929 | Ballou et al. | 101—25 |
| 1,830,120 | 11/1931 | McGowan | 29—130 X |
| 2,202,110 | 5/1940 | Maurer | 101—25 X |
| 2,308,117 | 1/1943 | Snyder | 101—25 |
| 3,120,805 | 2/1964 | Simon | 101—425 |

ROBERT E. PULFREY, *Primary Examiner.*

W. F. McCARTHY, *Assistant Examiner.*